July 29, 1930.  L. M. CURRIE  1,771,775
BATTERY SEAL COMPOSITION
Filed May 10, 1927
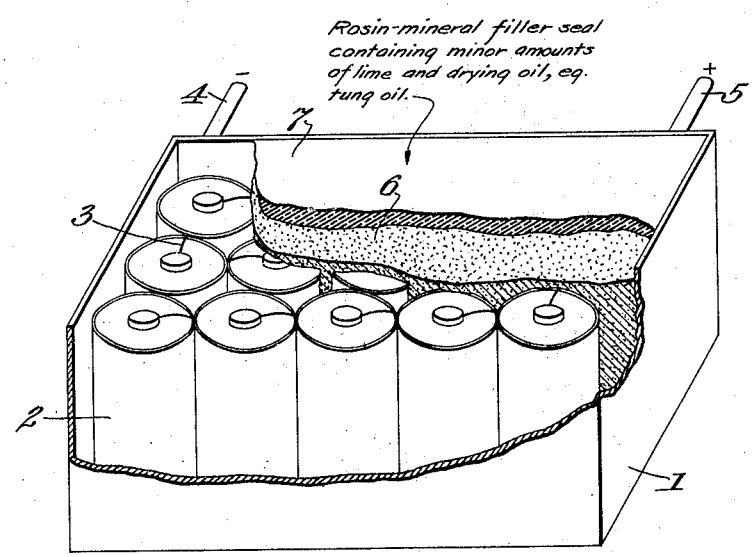

Patented July 29, 1930

1,771,775

UNITED STATES PATENT OFFICE

LAUCHLIN M. CURRIE, OF LAKEWOOD, OHIO, ASSIGNOR TO NATIONAL CARBON CO., INC., A CORPORATION OF NEW YORK

BATTERY SEAL COMPOSITION

Application filed May 10, 1927. Serial No. 190,281.

This invention relates to improvements in thermoplastic compositions for use in sealing dry cells and dry cell batteries. A composition which has been rather generally used to seal dry cells and dry cell batteries is a mixture of rosin and a mineral filler. Usually small amounts of lime, for strengthening purposes, and coloring matter are also present. Seals of this composition show a pronounced tendency to crack when subjected to sudden and extreme temperature changes. Such cracking is accentuated when lime is present and particularly when such seals are poured upon an asphaltic sub-seal base, as is the practice with some battery manufacturers.

In my copending application Serial No. 190,280 filed May 10, 1927, I have disclosed the addition of certain materials to rosin-mineral filler sealing compositions for the purpose of imparting thereto toughness and ability to withstand wide and sudden temperature changes without cracking and also to improve other properties thereof. Similar objects are comprehended by the present invention.

The figure of drawing, is a perspective view of a battery partly broken away.

According to the present invention small percentages of certain drying oils, preferably in conjunction with small amounts of certain additional materials hereinafter to be described, are added to the rosin-mineral filler composition. The drying oils which have been found suitable for the present purpose are Chinese wood oil or tung oil, soya bean oil, linseed oil, and perilla oil.

In general, the amount of oil and other treating agent required to produce the desired results will be less than 3% by weight of the seal being treated. The amount required will vary considerably depending upon the composition of the rosin-mineral filler seal being treated, and particularly with respect to the lime content thereof. A seal containing a relatively high lime content, for example 1% or more, will require a relatively large addition of treating agent to remove brittleness and insure toughness, whereas with a relatively low lime content much smaller quantities are effective.

Proportions of glycerine or other polyhydric alcohol equal to or less than the proportion of tung or other oil used are preferably added with the oil. Best results are obtained when a small percentage of a metallic soap, such as lead tungate, lead linoleate or lead resinate, is also present. The treating addition may also contain minor amounts of paraffin or a paraffin oil. Further, the substitution of castor oil for the glycerine component is not precluded.

The following comparative results indicate the improvement which may be obtained by the use of treating additions of the class described:

Example No. 1

One lot of batteries sealed with a composition containing approximately equal parts by weight of rosin and mineral matter, about 3% coloring matter and 1% lime, was placed in cold storage at 0° C., and observed for cracking of the seal. After 9 days, 60% of the batteries showed cracks in the seal and after 21 days the seal on 67% of the batteries had cracked.

Another lot of batteries similar in every respect except that 0.5% glycerine, 1.5% tung oil, 0.17% paraffin, and 0.01% precipitated lead resinate were added to the seal composition, was subjected to identical cold storage conditions and showed no cracking at the end of 21 days in cold storage.

Example No. 2

Two lots of batteries sealed with approximately the same rosin-mineral filler composition as specified in Example No. 1, but with the seal-treating addition of the treated lot consisting of 1.0% glycerine, 1.2% tung oil and 0.015% precipitated lead resinate, when subjected to cold storage conditions, showed similar improvements in favor of the treated seal. Of the lot containing untreated seal, the seal on 16% cracked in 4 days, and 23.5% in 7 days. None of the lot on which tung oil-glycerine-treated seal was used showed cracks at the end of 7 days in cold storage.

In both of the examples above mentioned the treated seal also showed improvement in other respects than those indicated, and particularly as to pouring properties, and freedom from pits and air bubbles. The untreated seal was poured with some difficulty and required a temperature of about 181° C., to permit of pouring with any degree of success. The untreated seal was also characterized by the presence of bubbles, with 30% of the batteries requiring retorching, whereas the oil-treated seal poured smoothly and evenly at 174° C., with only 8% requiring retorching.

In addition to the above-mentioned improved properties which are possessed by the treated seal as compared with the untreated seal, it is to be noted that the treated seal has improved finish and luster. It is further to be noted that the molten treated seal wets the brass terminals and other metallic portions of the cells with which it comes in contact much more readily than does the untreated seal composition, thus insuring more perfect sealing at these surfaces of contact.

Referring to the drawing, numeral 1 denotes a battery box or casing which may be made of cardboard, wood or other suitable material. Cells 2 are arranged in the casing and are preferably compactly assembled in three rows of five cells each. Connectors 3 join the cells in series and external terminals 4 and 5 are provided.

When the cells are properly assembled in the casing, an insulating asphaltic sealing compound is made fluid by heating and is poured about the cells, preferably in quantity sufficient to completely embed them and to extend over their tops to form a layer of substantial thickness thereon, as indicated at 6. After the asphaltic sub-seal 6 is solidified a finish layer 7 of sealing material composition of the kind more specifically described above is poured over the sub-seal to fill the casing substantially to the top.

The invention is shown in the drawing as applied to a conventional form of battery used in radio communication. It is to be understood, however, that it is not limited in application to this type of battery and may be applied in sealing other types of batteries as well as single cells.

It is also to be understood that various modifications may be made in the proportions and kinds of materials used in forming the rosin-mineral filler composition which forms the base for my new composition. For example, while rosin has been specified above, it will be understood that equivalent natural and artificial resins may be substituted. It will also be understood that various mineral materials may be used to make up the mineral filler component. Mineral filler materials which have been used successfully in making up my improved seal composition are sand and ground, fibrous asbestos in the proportions of about 36% and 10% by weight, respectively, of the seal composition.

I claim:

1. A sealing composition containing up to about 1% lime, up to about 3% Chinese wood oil and glycerine, up to 4% coloring matter, with the balance consisting of about equal parts of rosin and mineral filler.

2. A battery seal composition consisting principally of rosin and a mineral filler and including up to about 4% of a drying oil and lime.

3. A battery seal composition containing up to about 1% lime, up to about 3% of a drying oil and glycerine, up to 4% coloring matter, with the balance consisting of about equal parts of rosin and mineral filler.

4. A battery seal composition consisting principally of a resin and a mineral filler and including minor proportions of Chinese wood oil, glycerine and lime.

5. A battery seal composition containing approximately 95% of rosin and mineral filler, up to about 1% lime, and up to about 3% of Chinese wood oil, with the balance principally coloring matter.

6. A battery seal composition containing approximately 95% of rosin and mineral filler, up to about 1% lime, and up to about 3% of Chinese wood oil and glycerine, with the balance principally coloring matter.

7. A battery seal composition having approximately the following composition: 0.5% glycerine; 1.5% tung oil; 0.17% paraffin; 0.01% lead resinate; and up to 4% coloring matter, with the balance consisting of about equal parts of rosin and mineral filler.

In testimony whereof, I affix my signature.

LAUCHLIN M. CURRIE.